Sept. 10, 1957　　　　　　J. DIXLER　　　　　　2,805,500
VIEWER FOR PHOTOGRAPHIC SLIDES
Filed July 29, 1954　　　　　　　　　　2 Sheets-Sheet 1
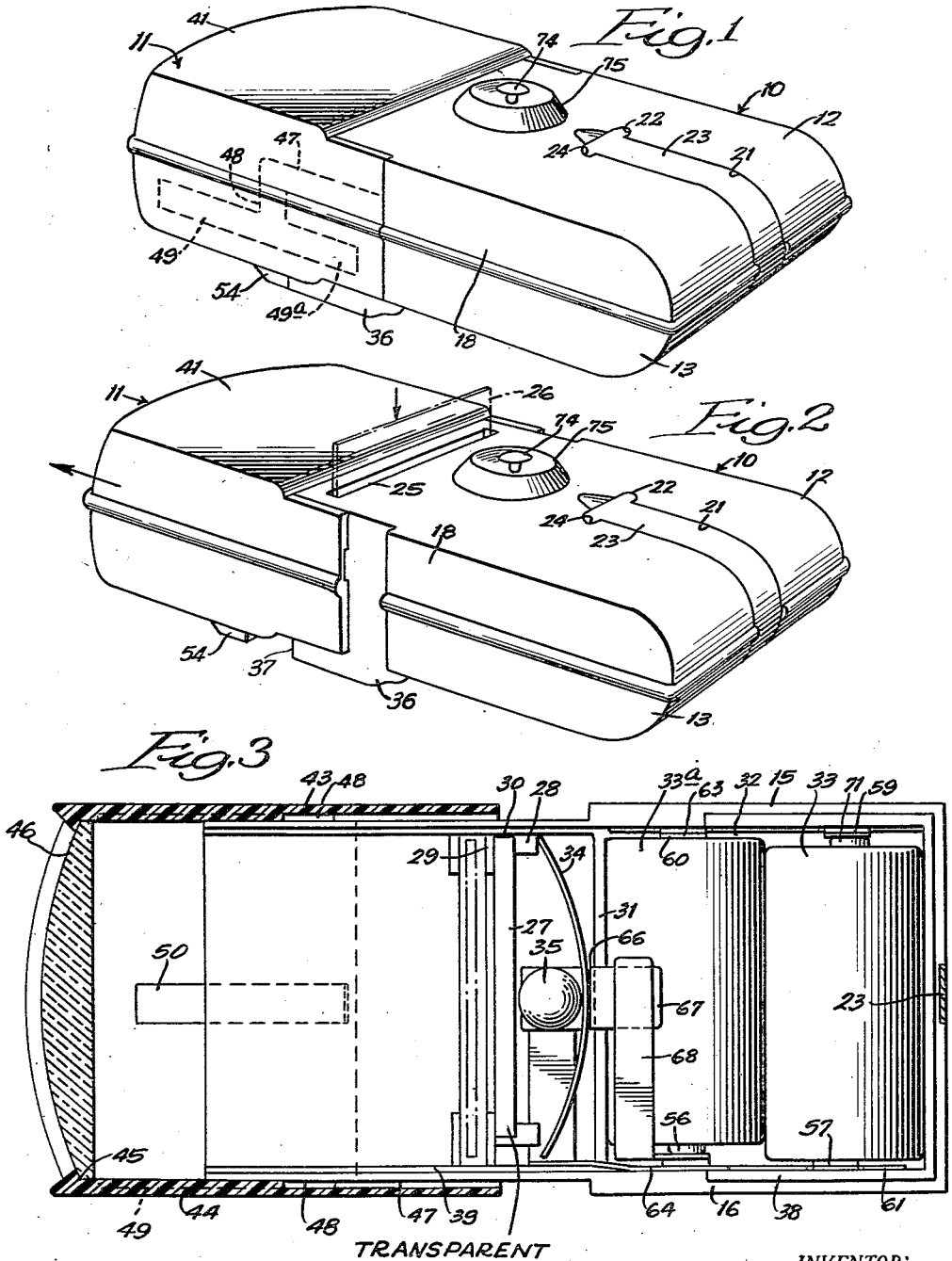
INVENTOR:
Julius Dixler,
BY
McDougall, Williams & Hersh,
ATTORNEYS.

Sept. 10, 1957 J. DIXLER 2,805,500
VIEWER FOR PHOTOGRAPHIC SLIDES
Filed July 29, 1954 2 Sheets-Sheet 2
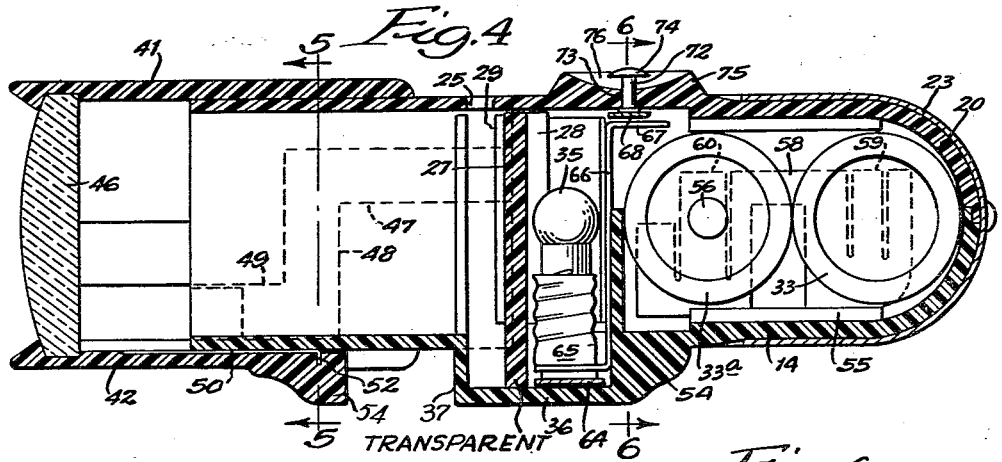
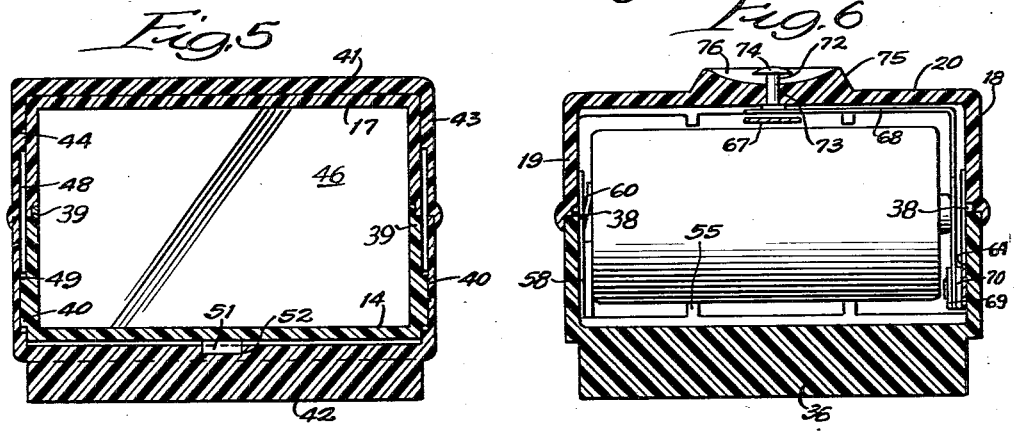
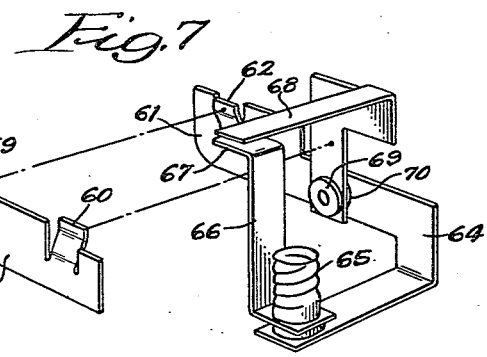
INVENTOR:
BY Julius Dixler,
ATTORNEYS.

2,805,500

VIEWER FOR PHOTOGRAPHIC SLIDES

Julius Dixler, Chicago, Ill.

Application July 29, 1954, Serial No. 446,490

2 Claims. (Cl. 40—63)

This invention relates to a viewer for films, slides, plates and the like, and it relates more particularly to a plate or slide viewer of the type described which is of compact construction and of small dimension to enable the viewer to be carried about as in a pocket or a small compartment and which is effective to enable easy and efficient operation for clear view of the pictures available on the spot.

It is an object of this invention to produce a portable viewer of the type described which is of small dimension.

Another object is to produce a portable viewer of the type described which is compact in construction and efficient in operation and which is formed of relatively few simple parts that are easily assembled into a low cost structure and in which replacement and repair of parts can be achieved in a simple and efficient manner.

A further object is to produce a viewer of the type described which may be assembled and disassembled as for replacement and for repair or to gain access to the interior thereof without the use of special tools and which embodies a new and novel means for efficient assembly of the parts into a rigid structure which resists inadvertent separation.

These and other objects and advantages of this invention will hereinafter appear and for purposes of illustration, but not of limitation, an embodiment of the invention is shown in the accompanying drawings in which—

Figure 1 is a perspective elevational view of a viewer embodying the features of this invention in closed position;

Figure 2 is a perspective elevational view similar to that of Figure 1 of the viewer in open position for use;

Figure 3 is a sectional view crosswise through the central portion of the viewer shown in Figure 1;

Figure 4 is a sectional elevational view through the center of the viewer shown in Figure 1;

Figure 5 is a sectional view taken substantially along the line 5—5 of Figure 4;

Figure 6 is a sectional view taken along the line 6—6 of Figure 4, and

Figure 7 is a perspective elevational view of the electrical elements of the illumination means used in the device shown in Figure 1.

Referring now to the drawings, the viewer is composed of a main casing 10 and a lens casing 11 both of which are formed of rigid material such as molded plastics, wood, sheet metal or the like. The main casing 10 comprises an upper housing member 12 and a lower housing member 13 of substantially uniform dimension which are received one on the other in interfitting relation to form the main casing which is substantially rectangular in cross section.

The lower housing member 13 includes a bottom wall 14 and upwardly extending side walls 15 and 16 and the upper housing member 12 is formed with a top wall 17 and depending side walls 18 and 19 which extend downwardly from the lateral edges of the top wall. The top and bottom walls of the upper and lower housing members respectively are formed with a rearward end portion which extends curvilinearly in the direction toward each other to the edge of the side walls to form a curvilinear end wall 20 of streamlined contour having aligned longitudinal grooves 21 extending forwardly from the rearward edge and terminating in laterally extending grooves 22 in the upper and lower walls respectively which receive a spring clip 23 in the form of a wire band having a T-shaped end portion 24, which seats within the corresponding grooves 22 and in which the body portion seats within the longitudinal grooves 21 for resiliently clasping the housing parts together in their assembled relation. The grooves 21 extend forwardly beyond the crosswise grooves 22 to provide finger openings to enable displacement of the end portions 24 to effect removal of the spring clip for disassembly.

The top wall 17 of the upper housing member 12 is provided with an elongate slot 25 which extends crosswise of the upper housing in the forward portion thereof and through which plates 26, slides or the like are adapted to be inserted in position for viewing immediately in advance of a diffuser plate 27 which extends vertically across the interior of the main casing and is supported in upright position by ribs 28 and 29 which extend laterally a short distance from the inner side walls of the lower housing member. Spaced rearwardly of the ribs which form the receiving grooves 30 for the diffuser plate, the bottom housing member is formed with a vertically disposed wall 31 that extends crosswise of the housing to separate the housing into a rear compartment 32 in which batteries 33 are mounted and a forward compartment containing the illuminating means including a curvilinear reflector 34 disposed between the wall 31 and the rib 28 and a bulb 35 which is located centrally between the diffuser plate 27 and reflector 34.

In the region of the illuminating means up to and including the portion in alignment with the plate receiving slot 25, the bottom wall of the housing is at a lower level than the remainder, to increase the vertically spaced relation of the top wall 17 of the upper housing member and the bottom wall 14 of the lower housing member in the plate receiving portion and the illuminating means associated therewith. The bottom wall portion 36 at a lower level blends into the rear wall portion 14 by continuous curvilinear sections for appearance but the forward portion terminates abruptly to provide an abutment 37 forwardly of the plate receiving opening to function as a stop, as will hereinafter be defined, to determine the closed or inoperative position of the casings.

As a further improvement for effecting the assembled relation, the width of the upper and lower housing members 12 and 13 is of lesser dimension in the forward portions thereof from a point substantially in alignment with illuminating means than the remainder by an amount slightly less than the thickness of walls forming the housings. The upper edges of the side walls of the lower housing are formed with flanges 38 and 39 extending upwardly from the inner portions thereof except for a section which is free of flanges adjacent the forward end portion of greater crosswise dimension. The upper housing section is similarly dimensioned but the interfitting flanges extend downwardly continuously from the outer edge portions so that the flanged portion of the forward section of lesser crosswise dimension engages the flanged portion of the rearward section of the lower housing member during initial engagement until displacement forwardly to enable the flanges of the forward section of lesser dimension to clear the flange 38 in the section of wider dimension whereby the elements may be adjusted to interfit the flanges into the assembled relation. This interengagement between offset flanges permits the upper housing member to be moved a limited distance relative to the lower housing member from the assembled relation but prevents disengagement between the parts until the main casing is separated from the other elements operative therewith, as will hereinafter be defined. For purposes of assembly, and for maintaining the assembled relation while permitting endwise adjustment of the casing for focusing purposes, the forward end portions of the lower housing member are provided with laterally projecting abutments or lugs 40 in the lower end portion.

The forward end portion of the main casing is received in telescoping relation within the open end of a separate lens casing 11 formed of top and bottom walls 41 and 42 interconnected by side walls 43 and 44 and open at the forward and rearward ends. Grooves 45 in the forward end portion of the top, bottom and side walls mount a lens member 46 in the forward open end of the lens casing in alignment with the diffuser plate 27 and the illuminating means. The bore between the side, bottom and top walls is dimensioned to correspond to the outer wall to wall dimension of the forward end portion of the main casing for enabling the main casing to be telescoped therein for longitudinal endwise movement in the direction toward and away from the lens for focusing.

To effect the assembled relation of one casing in telescoping relation with the other in a manner to prevent separation, the side walls 43 and 44 of the lens casing are formed with internal grooves interconnected one with the other to provide a continuous passage for the preferably rectangular lugs or guide blocks 40 on the housing. The grooves include an upper groove 47 extending forwardly for about one-half the length of the casing from the rearward end of the side wall in the lower portion of the upper half. A vertically disposed groove 48 extends downwardly from the forward end portion of the upper groove 47 and connects with the rearward end portion of a lower groove 49 which extends further forwardly from an intermediate portion of the lens housing almost to the lens in the lower portion of the lower half of the housing and which may, in the alternative, also have a rearwardly extending portion 49ᵃ for greater endwise adjustment while in the assembled relation. The height and the width of the communicating grooves correspond to the height and the width of the abutment 40 extending laterally from the forward end of the lower casing member 13 to enable passage of the abutment through said grooves during relative endwise movement of the lower casing to effect the assembled relation, as will hereinafter be pointed out.

The telescoping portion of the main casing is adapted resiliently to be contained within the open end of the lens casing by means of a leaf spring 50 having a downturned end portion 51 received within a narrow slot 52 extending crosswise in the central portion of the bottom wall 42 adjacent the forward end thereof while the intermediate portion of the leaf spring is bowed upwardly resiliently to engage the underside of the bottom wall 14 of the main casing when in position thereover. The side walls of the lens casing extend beyond the top and bottom walls and the bottom wall, which terminates at its rearward end slightly before the top wall, is formed with a depending portion 54 corresponding to the portion 37 of the main casing for cooperation therewith as a stop means to determine the extent of relative telescoping movement of the casing members when in their collapsed or closed position.

The means for illumination, essential to the operation of the device, may be embodied in various ways. As illustrated in the drawings, the dry cell batteries 33 or the like may be arranged in side by side relation upon the upstanding reinforcing ribs 55 extending longitudinally through the battery compartment of the lower housing with the batteries 33 and 33ᵃ extending crosswise of the housing. The terminal portions 56 and and 57 at one end of the batteries are connected in series by a conductor plate 58 positioned in the side wall of the compartment with resilient fingers 59 and 60 extending inwardly for engagement with the terminals. Another conductor 61 extending longitudinally along the opposite side wall of the compartment has a resilient tongue 62 which extends inwardly to engage the base terminal 63 of the battery 33ᵃ and a plate portion 64 extends downwardly alongside the wall and across the bottom wall to the base of the socket 65 for connection to the base terminal of the bulb 35. The socket wall 65 is connected by a conductor having a portion 66 which extends upwardly in closely spaced relation with the top wall of the main casing and a flanged portion 67 which extends horizontally forwardly in a closely spaced relation with a horizontally disposed plate 68 that extends laterally across the top of the casing and then has a portion extending rearwardly and down to a terminal 69 which is separated by insulating member 70 from the plate 61 and which is in position to engage the terminal 71 of the battery 33.

The electrical connection is made to illuminate the bulb when the top plate 68 is deflected downwardly into contacting relation with the flange plate 67. Various means may be employed to accomplish such deflection. For example, use may be made, as illustrated, of a shaft 72 which is mounted for endwise shifting movement through an opening 73 on the top wall of the upper casing between normal and actuated positions of adjustment. The lower end of the shaft generally rests upon the upper surface of the contact plate 68 which resiliently urges the shaft towards normal position. A head 74 which is provided on the end portion of the shaft extends outwardly beyond the casing to enable engagement as by means of a finger for displacement to actuated position whereby the pin causes deflection of the arm 68 into contact with the flange 67 for illumination. The upper surface of the top wall may be raised to provide a rim 75 about the operating shaft 72 with a curvilinear recess 76 or crater to facilitate operation of the shaft between normal and actuated positions and to protect the shaft from injury when in normal position.

For assembly, the upper housing is separated from the lower housing of the main casing, and the bulb and batteries positioned therein for use. The lower housing is then brought into end to end relation with the lens housing with the laterally extending abutments 40 in alignment with the rearward end of the grooves 47 in the side walls of the lens housing. When in this position, the lower housing member may be displaced forwardly of the telescoping relation into the lens housing until the abutments 40 engage the forward edge of the slots 47. The lower housing may then be displaced downwardly as the abutments 40 travel through the grooves 48 until the abutments are aligned with the forwardly extending grooves 49 in the lower portion of the lens housing. When in this position the lower housing is in proper alignment for the assembled relation. The upper housing member may then be positioned in alignment with the lower housing with the forward end portion over the rearward end portion of the lower housing following which the upper housing may be displaced forwardly until the flanges of the forward portion of lesser dimension clear the flanges of the lower housing portion of larger dimension to enable the two units to be assembled together in interfitting relation. The upper housing may then be displaced forwardly until a proper assembled relation is established to bring the rearward ends of the upper and lower housings into alignment. The resilient clasping band 23 may then be inserted into its receiving groove to clasp the two members together. In this position, the elements are in their assembled relation and the main casing is in position to be displaced forwardly and back in the direction toward and away from the lens 46 by an amount which is limited in forward movement between abutments 37 and 54 and which is limited in its movement in the direction away from each other by engagement between the abutments 40 and the rearward end portion of the lower slot 49 or 49a. When in fully extended position with the guide block 40 in the rearward end portion of the slot 49a, it will be apparent that the fitting relation of the blocks in sliding engagement with the walls defining the grooves will function to assist the support of one casing in the other in proper alignment, notwithstanding the minimum amount in telescoping relation.

The extent of relative movement between the casing parts in open and in closed position is adapted to provide for the desired focusing and the extent of movement in closed position is adapted to enable the top wall 41 of the lens housing to extend over the top wall 17 of the main casing by an amount to conceal the slot 25 in the upper portion thereof so as to protect the interior of the casing against the infiltration of dirt or other foreign substances which might interfere with the proper operation and use of the device when in closed position.

Disassembly for replacement or repair of parts may be effected simply by removal of the clasping band 23 which enables the upper housing member to be disengaged from the lower housing member to enable its removal which thus frees the lower housing member to enable the abutments 40 to move rearwardly through slot 49, upwardly through slot 48 and rearwardly through slot 47 for separation.

It will be apparent that the blocks 40 and the slots 47 and 49 may be otherwise located in their respective elements. For example, the slot 47 may be located in the upper portion of the upper half of the lens housing with the lower slot in the upper portion of the lower half and that the block 40 could be located in the upper portion of the bottom section of the casing or the block may be provided in the upper section of the housing and the slots disposed oppositely with the rearward slot 47 in the lower portion and the guide slot 49 in the upper portion and that the slots and blocks may be interchanged without change in the concept of assembly.

It will be understood that various other changes may be made with respect to the dimensions of the lens member located in the forward end portion of the lens casing and with respect to the construction and operation of the illuminating means and that other changes may be made in the details of construction, arrangement and operation without departing from the spirit of the invention, especially as defined in the following claims.

I claim:

1. In a device for viewing photographic slides or the like, the combination comprising a generally tubular lens casing of generally rectangular cross section and having front and rear ends with lens means mounted in said front end, a body casing having a front portion of generally rectangular cross section telescopically received within the rear end of said lens casing, said body casing comprising upper and lower interfitting sections, said lens casing including opposite side walls with respective internal groove means therein, each of said groove means including a stop groove portion extending longitudinally along the lower portion of said side wall and terminating short of said rear end of said lens casing, said lower section of said body casing having oppositely projecting lateral stop lugs slidably received in said stop groove portions for retaining said body casing against rearward withdrawal from said lens casing, each of said groove means including an entrance groove portion extending longitudinally along said side wall in a forward direction from the rear end of said lens casing for receiving the corresponding lug in assembling and disassembling said device, said entrance groove portion being offset upwardly from said stop groove portion, each of said groove means including a connecting groove portion extending between said stop groove portion and the rear end of said entrance groove portion, said device being adapted to be assembled by inserting said lower section of said body casing into said lens casing with said lugs passing forwardly through said entrance groove portions, into said stop groove portions, and then inserting said upper section of said body casing into said lens casing to retain said lugs in said stop groove portions, and means disengageably joining said upper and lower sections.

2. In a device for viewing photographic slides or the like, the combination comprising a generally tubular lens casing of generally rectangular cross section and having front and rear ends with lens means mounted in said front end, a body casing having a front portion of generally rectangular cross section telescopically received within the rear end of said lens casing, said body casing comprising upper and lower interfitting sections, said lens casing including opposite side walls with respective internal groove means therein, each of said groove means including a stop groove portion extending longitudinally along said side wall and terminating short of said rear end of said lens casing, one of said sections of said body casing having oppositely projecting lateral stop lugs slidably received in said stop groove portions for retaining said body casing against rearward withdrawal from said lens casing, each of said groove means including an entrance groove portion extending longitudinally along said side wall in a forward direction from the rear end of said lens casing for receiving the corresponding lug in assembling and disassembling said device, said entrance groove portion being offset vertically from said stop groove portion, each of said groove means including a connecting groove portion extending between said stop groove portion and the rear end of said entrance groove portion, said device being adapted to be assembled by inserting said one section of said body casing into said lens casing with said lugs passing forwardly through said entrance groove portions and vertically through said connecting groove portions into said stop groove portions, and then inserting the other section of said body casing into said lens casing to retain said lugs in said stop groove portions, and means disengageably joining said upper and lower sections.

References Cited in the file of this patent

UNITED STATES PATENTS

| | | |
|---|---|---|
| 2,088,363 | Caldwell | July 27, 1937 |
| 2,212,123 | Neill et al. | Aug. 20, 1940 |
| 2,336,288 | Peterson | Dec. 7, 1943 |
| 2,452,658 | Horne | Nov. 2, 1948 |
| 2,484,591 | Rochwite | Oct. 11, 1949 |
| 2,534,100 | Baumgartner | Dec. 12, 1950 |
| 2,598,670 | Bentley et al. | June 3, 1952 |
| 2,604,814 | Smith | July 29, 1952 |
| 2,627,781 | Welborn | Feb. 10, 1953 |